(No Model.)
H. W. GURNEY.
MOTOR.
No. 272,429. Patented Feb. 20, 1883.
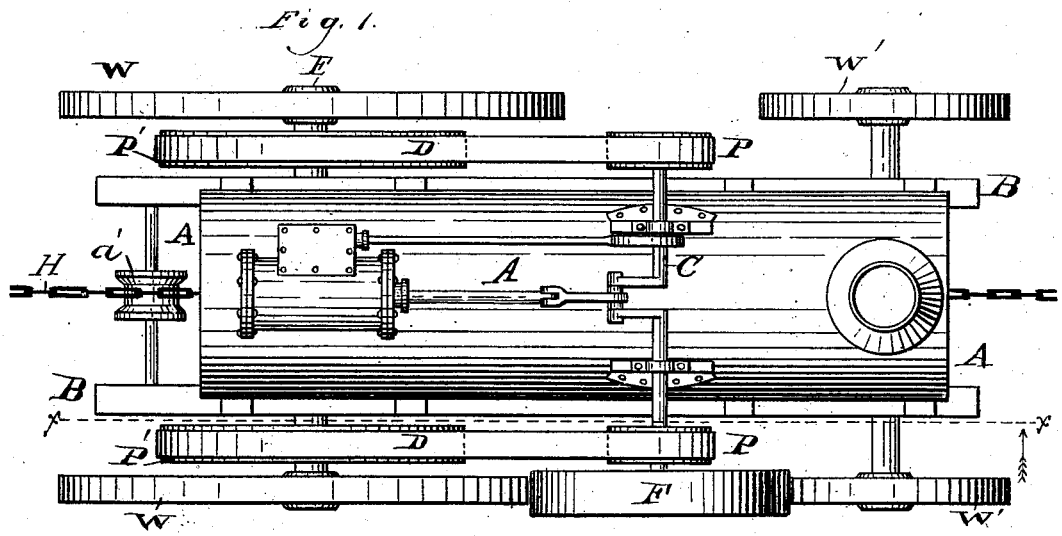
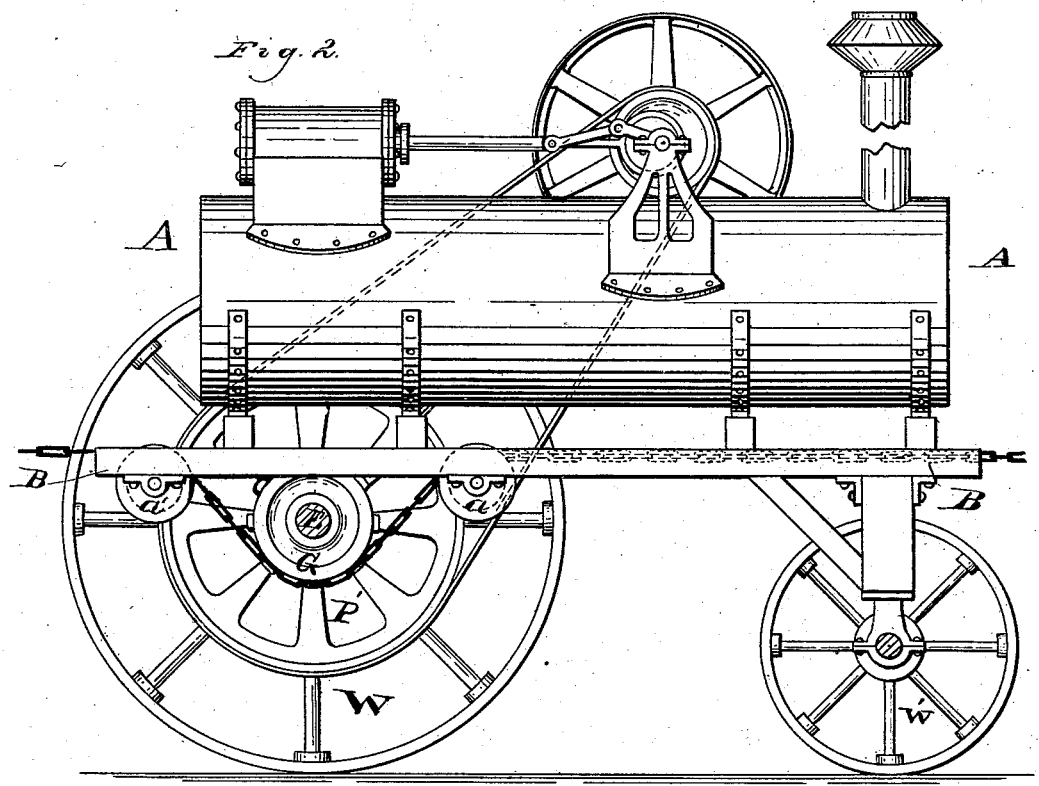
Witnesses.
Henry Frankfurter
Frank Johnson
Inventor.
Henry W Gurney
per.
H Harrison
Attorney.

UNITED STATES PATENT OFFICE.

HENRY W. GURNEY, OF EAST NODAWAY, IOWA.

MOTOR.

SPECIFICATION forming part of Letters Patent No. 272,429, dated February 20, 1883.

Application filed May 4, 1882. (No model.)

*To all whom it may concern:*

Be it known that I, HENRY W. GURNEY, a citizen of the United States of America, residing at East Nodaway, in the county of Adams and State of Iowa, have invented certain new and useful Improvements in Motors, of which the following is a specification.

My invention relates to improvements in motors.

The object of my invention is to provide a motor to be used for plowing, drawing heavy loads, &c., and so arranged that it may be used as an ordinary portable engine for thrashing or any other purpose for which such engines are used.

To this end my invention consists in the construction and arrangement of parts hereinafter described with reference to the accompanying drawings, in which—

Figure 1 is a top view or plan of my improved motor. Fig. 2 is a side elevation of the same, partly in section on the line $x\ x$ of Fig. 1.

Like parts are referred to by similar letters of reference throughout the several views.

In the said drawings, A A represents a steam engine and boiler, constructed and arranged in a similar manner to an ordinary portable engine of any of the well-known styles, and mounted on a suitable frame, B B, supported on the wheels W W W′ W′.

C is the crank-shaft of the engine, provided with the customary fly-wheel and pulley, F, and carrying at or near each end a wheel or pulley, P, which are connected by belts D D or equivalents to similar wheels, P′ P′, secured on the rear axle, E, on which the wheels W W are loosely placed.

Secured rigidly on the axle E at any convenient point in its length is a chain or sprocket wheel, G.

H is a chain, which is designed to be secured at each end on opposite sides of a field or otherwise, and passes under the engine and boiler A A, over a loosely-turning wheel, $a$, journaled in suitable bearing on frame B B, from thence under and engaging with the sprocket or chain wheel G, and thence up and over a second loose wheel, $a'$, similar to the one $a$ referred to above.

The operation is as follows: The chain H, passing over the loose wheels $a$ and $a'$ and under the chain-wheel G in the manner above described, and as shown in Fig. 2 of the drawings, is attached on opposite sides of a field, or at any points between which it is desired to draw a load. The plows, wagons, or whatever is desired to be drawn is attached to the motor and the engine started through the agency of the pulleys P and P′ and belts D. The axle E, carrying the chain-wheel G, is revolved, and, engaging with the chain H, propels the motor and load, the wheels W W, as well as those W′ W′, turning loosely on their axles.

Two or more of the chain-wheels G may be used, if desired, a corresponding number of chains being provided.

It is obvious that the engine may be employed as an ordinary portable engine for drawing any kind of machinery by simply removing the belts D and applying a belt to the fly-wheel pulley F.

Having thus described my invention, what I claim as new, and desire to secure by Letters Patent, is—

The combination of the engine A, frame B, crank-shaft C, having fly-wheel F and pulleys P P, rear axle, E, having pulleys P′ P′ and chain or sprocket wheel G, loosely-journaled wheels $a\ a'$, placed at the front and back of said sprocket-wheel, belts D D, chain H, and wheels W W′, all constructed and arranged as and for the purpose described.

HENRY W. GURNEY.

Witnesses:
ARTHUR ATKINSON,
F. H. SMITH.